June 16, 1925.

J. L. DALE

TRAP

Filed Feb. 9, 1924

J. L. Dale
INVENTOR

BY Victor J. Evans
ATTORNEY

June 16, 1925.
J. L. DALE
TRAP
Filed Feb. 9, 1924   2 Sheets-Sheet 2
1,542,673
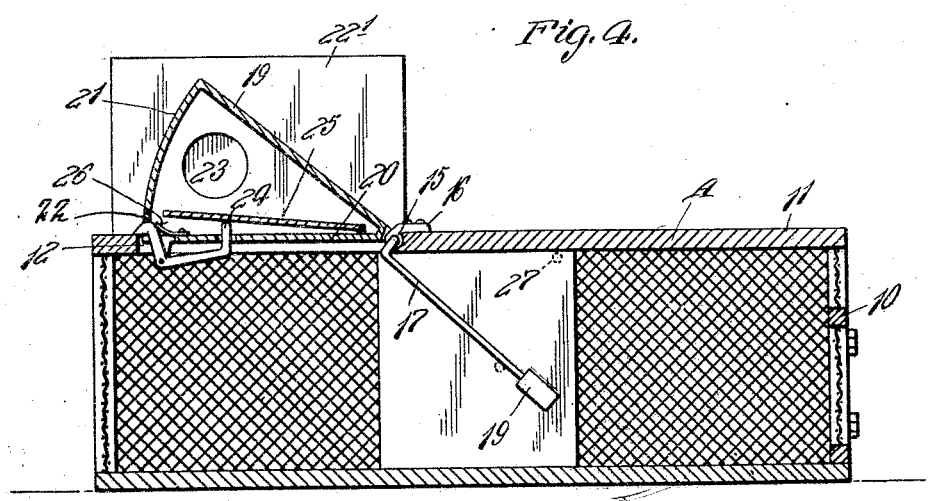
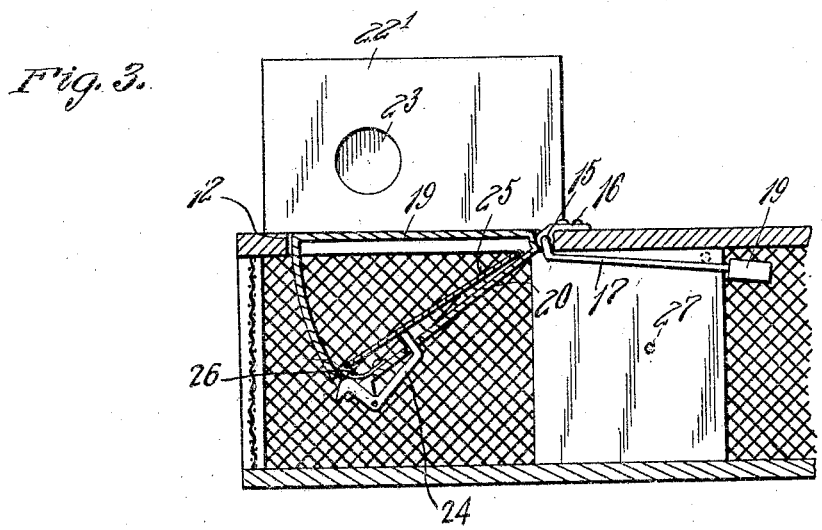
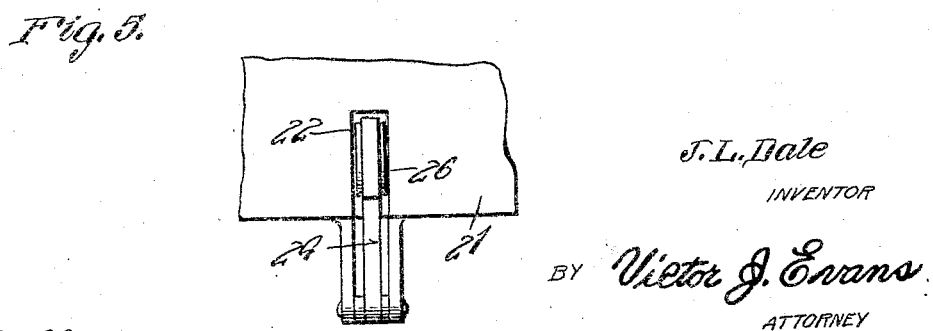
J. L. Dale
INVENTOR
BY Victor J. Evans
ATTORNEY

Patented June 16, 1925.

1,542,673

UNITED STATES PATENT OFFICE.

JOSEPH L. DALE, OF WISE, VIRGINIA.

TRAP.

Application filed February 9, 1924. Serial No. 691,777.

*To all whom it may concern:*

Be it known that I, JOSEPH L. DALE, a citizen of the United States, residing at Wise, in the county of Wise and State of Virginia, have invented new and useful Improvements in Traps, of which the following is a specification.

This invention contemplates the provision of a trap for rats, mice or the like, and embodies a pivotally mounted trapping compartment normally arranged above the body of the trap and in which the animal is induced to enter in an effort to obtain the bait, the trapping compartment subsequently gravitating within the body of the trap under the weight of the animal, thus prohibiting the escape of the latter and forcing the animal to enter the trap proper, whereupon the trapping compartment is reset.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 3 is a fragmentary view showing the depressed position of the trapping compartment.

Figure 4 is a sectional view taken on the line 4—4 of Figure 1.

Figure 5 is a detail enlarged view of the depressing mechanism.

Figure 1:
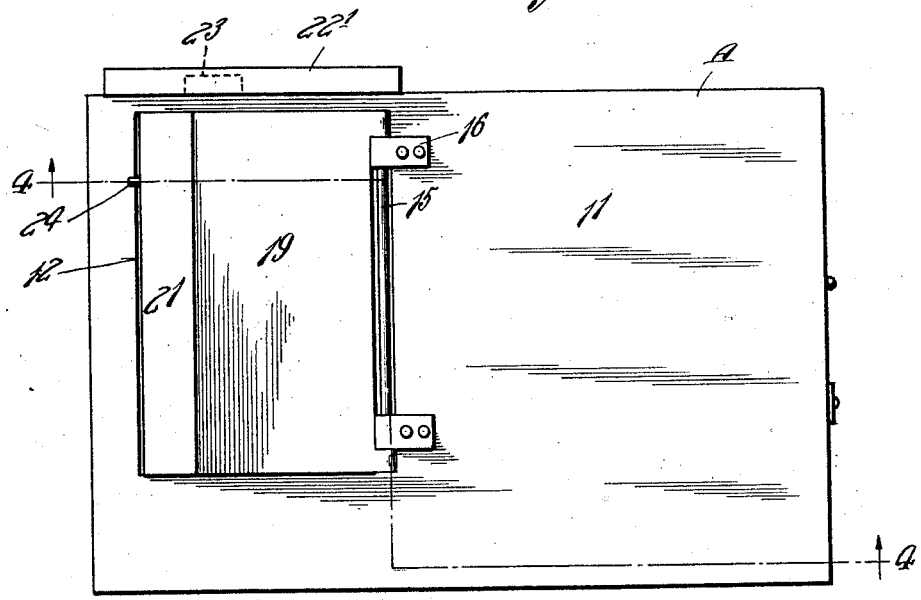
Figure 1 is a top plan view of the invention.
Figure 2:
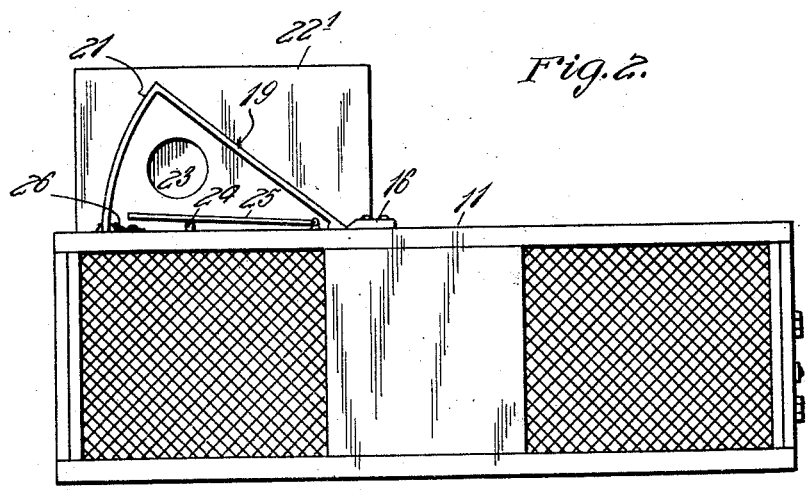
Figure 2 is a side elevation.

Referring to the drawings in detail, A indicates the trap proper which is in the nature of a receptacle of any desired contour, and preferably constructed from light foraminated material. The receptacle is provided with a door at one end as at 10 which may be retained in a closed position by any suitable means. The top 11 of the trap proper is provided with an opening 12 through which the trapping compartment above referred to operates. This trapping compartment is carried by a shaft 15 journalled in suitable bearings 16 and arranged transversely of the top, the shaft having one end offset as at 17 to lie parallel with the adjacent sides of the trap body, and which offset end supports a suitable weight 19. This weight normally maintains the trapping compartment elevated above the top of the trap proper, and it is into this compartment that the animal enters in an effort to obtain the bait. This trapping compartment is substantially triangular in cross section, including oppositely inclined top and bottom walls 19 and 20 respectively which are connected with the shaft at their adjacent ends, while the spaced ends of these walls are connected by an end wall 21 having an opening therein indicated at 22. The opposite sides of this compartment are opened, although one side is arranged adjacent the strip 22' secured to one side of the trap and provided with a bait receiving recess 23. When the trapping compartment is in its normal position, the bait is arranged in alignment with the compartment, so that it can be viewed by the animal from one side thereof, and when the animal enters the compartment in an effort to obtain the bait, the compartment is released and allowed to gravitate downwardly within the trap proper to prohibit the escape of the animal. The only apparent avenue of escape is into the trap proper indicated at A, and when the animal leaves the trapping compartment, the weight 19 operates to return the trapping compartment to its normally elevated position, thereby automatically resetting the trap for further use.

Arranged upon the bottom wall of the trapping compartment is a sliding bolt 24 which is connected with a treadle 25, the former being spring pressed as at 26 to project the bolt through the opening 22 of the trapping compartment, to rest upon the top of the trap proper and thereby hold the compartment in an elevated position. When the animal enters the trapping compartment to secure the bait, and steps upon the treadle, the bolt is retracted within the compartment thereby releasing the latter, at which time the compartment immediately gravitates to the position shown and hereinabove described. Carried by one side of the receptacle are spaced pins 27 between which the offset extremity of the shaft operates, and which extremity alternately contacts these pins to limit the pivotal movements of the trapping compartment.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. In a trap of the character described, a receptacle having an opening in the top thereof, a trapping compartment mounted for pivotal movement through said opening, said compartment being open at both ends, a bait holder arranged at one side of the receptacle and closing the adjacent end of the compartment, means including a sliding bolt normally projecting through said compartment and engaging said receptacle to hold the compartment elevated above the top thereof, said means being adapted to be actuated by the animal upon entering the compartment to release the latter, whereby said compartment gravitates to a lowered position within the receptacle, a shaft supporting the compartment for pivotal movement, a weight on one end of the shaft for automatically returning the compartment to its normal position after the animal has passed from the compartment into the receptacle and means for limiting the pivotal movement of said compartment.

2. A trap comprising a receptacle having an opening in the top, a trapping compartment pivotally mounted within the opening in the top and opening fulcrumed at both sides, a bait compartment arranged on the receptacle and to one side of the trapping compartment and having an opening which permits the bait to be seen from one side of the trapping compartment, a pivoted platform within the trapping compartment, a pivoted latch element carried by the trapping compartment and having one end normally engaged with the top wall of the receptacle and its opposite end engaging the platform to normally hold the same in elevated position, the operation of the platform incident to the stepping of the animal thereon serving to disengage the latch element from the receptacle and thereby allow the trapping compartment to move downwardly through the opening in the top and means for returning the trapping compartment to normal position.

In testimony whereof I affix my signature.

JOSEPH L. DALE.